United States Patent [19]

Bennett et al.

[11] 4,097,458
[45] * Jun. 27, 1978

[54] METHOD FOR PREPARING POLYPHENYLENE ETHERS

[75] Inventors: James G. Bennett; Glenn D. Cooper, both of Delmar, N.Y.

[73] Assignee: General Electric Company, Pittsfield, Mass.

[*] Notice: The portion of the term of this patent subsequent to Feb. 24, 1991, has been disclaimed.

[21] Appl. No.: 427,996

[22] Filed: Dec. 26, 1973

[51] Int. Cl.$^2$ .............................................. C08G 65/44
[52] U.S. Cl. ................................................ 260/47 ET
[58] Field of Search ................................... 260/47 ET

[56] References Cited

U.S. PATENT DOCUMENTS 3,306,875  2/1967  Hay ....................................... 260/47
3,838,102  9/1974  Bennett et al. ........................ 260/47

OTHER PUBLICATIONS

Chem. Abstr. 7th Coll. Ind., Oct. 1969, (pp. 2148S, 3532S–3533S & 10,542S).
Chem. Abstr., 8th Coll. Ind., Mar. 1973, (pp. 2909S, 4864S–4865S & 14,334S).

*Primary Examiner*—Harold D. Anderson
*Assistant Examiner*—E. A. Nielsen
*Attorney, Agent, or Firm*—Morgan, Finnegan, Pine, Foley & Lee

[57] ABSTRACT

An improved process is disclosed for preparing polyphenylene ethers in which a complexing agent selected from the group consisting of biguanide, di-o-tolylbiguanide, dicyanodiamide, and L-Arginine is employed to terminate the oxidative coupling reaction and facilitate the recovery of the polymer.

13 Claims, No Drawings

METHOD FOR PREPARING POLYPHENYLENE ETHERS

This invention relates to the oxidative coupling of phenols, and more particularly, to the use of a complexing agent selected from the group consisting of biguanide, di-o-tolylbiguanide, dicyanodiamide and L-Arginine as a means of terminating the reaction and facilitating the recovery of the polyphenylene ether resin.

BACKGROUND OF THE INVENTION

The polyethylene ethers and processes for their preparation are known in the art and described in numerous publications including Hay, U.S. Pat. Nos. 3,306,874 and 3,306,875. Other procedures are described in Bennett and Cooper, U.S. Pat. Nos. 3,639,656, 3,642,699 and 3,661,848. All of these patents are incorporated by reference.

The processes most generally used to produce the polyphenylene ethers involve the self-condensation of a monovalent phenol in the presence of an oxygen-containing gas and a catalyst.

At the conclusion of the reaction, the reaction solutions obtained, e.g., by oxidizing 2,6-xylenol with a copper-amine catalyst, are extracted with aqueous mineral acid or acetic acid or a mixture of water and carbon dioxide to remove the metallic component of the catalyst and the amine, before isolation of the polymer by precipitation with an antisolvent, such as methanol. It is important to remove the metallic catalyst residue from the polymer because contamination of the polymer by metallic residues results in discoloration and degradation.

The use of aqueous acid is objectionable, as it necessitates a separate extraction step to remove copper and the use of an alkali metal hydroxide to recover amine from the aqueous acid extracts. The use of a complexing agent selected from the group consisting of biguanide, di-o-tolylbiguanide, dicyanodiamide and L-Arginine permits the removal of the metal catalyst without a separate extraction step.

DESCRIPTION OF THE INVENTION

According to the present invention, in a process for forming a polyphenylene ether by an oxidative coupling reaction in the presence of a metal ion-amine catalyst comprising passing an oxygen-containing gas through a reaction solution and said catalyst, there is provided the improvement which comprises separating the catalyst from the polyphenylene ether by the addition of a sufficient amount of a complexing agent selected from the group consisting of biguanide, di-o-tolylbiguanide, dicyanodiamide and L-Arginine to produce a mixture of complexed catalyst and polyphenylene ether and thereafter separating the polyphenylene ether from the mixture, preferably by adding an antisolvent for the polyphenylene ether to precipitate said polyphenylene ether.

The term "polyphyenylene ether" includes those polymers disclosed and claimed in Hay, U.S. Pat. Nos. 3,306,874 and 3,306,875, whenever produced by an oxidative coupling reaction comprising passing an oxygen-containing gas through a reaction solution.

In general, the polyphenylene ether resins will be of the formula

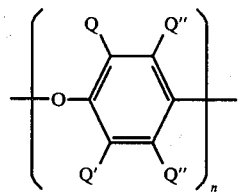

wherein Q is a monovalent substituent such as hydrogen, a hydrocarbon radical, a halohydrocarbon radical having at least two carbon atoms between the halogen atom and the phenol nucleus hydrocarbonoxy radicals and halohydrocarbonoxy radicals having at least two carbon atoms between the halogen atom and the phenol nucleus, Q' and Q" are the same as Q, and in addition, halogen with the proviso that Q, Q' and Q" are all free of a tertiary alpha-carbon atom, and n is a whole integer equal to at least 50.

The polyphenylene ethers are made by treating a solution of the corresponding phenol, optionally substituted with chlorine, bromine or iodine in the para-position, with an oxygen-containing gas in the presence of a metal-amine complex catalyst. The metal component can comprise copper, manganese, cobalt, nickel, vanadium, chromium and salts thereof, but copper is preferred. Primary, secondary and tertiary amines may be used as the amine component of the catalyst.

The reaction solvent can be a halogenated aliphatic solvent, e.g., trichloroethylene, or an aromatic solvent, e.g., benzene, toluene, xylene, chlorobenzene, nitrobenzene, and the like, as well as many others which will be obvious to those skilled in this art. Especially preferred solvents are aromatic hydrocarbons, e.g., toluene or benzene.

The polyphenylene ether-forming reaction can be carried out under a wide variety of well known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25°–50° C. The degree of polymerization is primarily controlled by the reaction time, although catalyst activity, promotors temperature, oxygen flow rate and other parameters have known effects. To save unnecessarily detailed explanation of these known process details, reference is made to the above-mentioned Cooper or Hay patents.

At the point where the polymerization reaction reaches the desired yield, and the polymer reaches a desired molecular weight, the reaction solution will comprise a solution of polyphenylene ether, typically from 1 to 30% by weight and usually from 5 to 25% by weight, metal and amine, typically from about 0.005 to 1.5% by weight of metal, from about 0.1 to about 6.0% by weight of amine and minor amounts of other materials, such as various promoters, byproducts, unreacted monomer and the like. Such reaction solutions are then treated with the complexing agents in accordance with the present process.

The manner of contacting the reaction solution with the particular complexing agent is not critical to the invention. For example, the complexer may be added in one portion to the reaction mixture. The complexed catalyst component can then be extracted by the water produced in the polymerization reaction by centrifuging and decanting.

On the other hand, the complexing agent may be added in two or more portions, with additional water, above and beyond that produced in the polymerization reaction. After each contact, liquid-liquid extraction may be accomplished in suitable process equipment, e.g., a decantation tank, by stirring, separating the layers, and/or centrifuging and decanting.

In any event, washing the reaction mixture with water after contacting with the complexing agent has a beneficial effect on reducing the amount of metal ultimately found in the polymer.

In addition to batch-type extractions, the present process is applicable to continuous liquid-liquid extraction. For example, the reaction solution can be contacted in an extraction column of the multistage type using an aqueous stream of complexing agent as an extractant. Most efficiently, this will be done in a countercurrent fashion. The reaction mixture in toluene solution can be introduced into the bottom of a column to pass upwardly against a downwardly flowing aqueous stream of chelating agent. Polymer solution substantially free of copper residue can be recovered from the top of the column. The factors controlling the use and efficiency of such columns are well known to those skilled in the art, and to save unnecessarily detailed explanation, the disclosure in Modan, U.S. Pat. No. 3,630,995 which describes the use of such columns using aqueous acids (which are not complexing agents) as an extractant is incorporated herein by reference.

Although relatively large amounts of the complexing agents can be used, e.g., from 0.1 mole to about 100 moles per mole of metal ion in the reaction solution, it is economically advantageous to select an amount which is sufficient to provide from about 0.25 to about 10 moles and preferably about 1.0 to about 6.0 moles of complexing agent per mole of metallic catalyst component.

In batch-type processes, the time of contact can vary widely, e.g., from 1 or 2 minutes up to 48 hours or more. Generally speaking, however, stirring for about 5 minutes to about 2 hours will be sufficient.

In the continuous multistage liquid-liquid extraction embodiments, the disclosed complexing agents may be used in aqueous solution at concentrations which give good extraction efficiency, e.g., from about 1 to about 40% by weight in water. The lower concentrations, e.g., from about 1 to about 10% by weight, are preferred and it is desirable that the ratio of the organic phase or reaction solution to the aqueous phase or complexing agent solution vary between 50:1 and 15:1 with the higher ratios being used at higher concentrations of the complexing agent in the aqueous phase.

The manner of isolating the polyphenylene ether from the solution after removal of the metallic component as a complex is not critical to the invention. For example, the polyphenylene ether can be isolated by precipitation from a reaction solution with an antisolvent such as an excess of an alcohol, i.e., methanol. The filtered product can be slurried in alcohol, and if desired, stirred with a decolorizing agent and then the polyphenylene ether is filtered off and converted to films, fibers, molded articles and the like by conventional methods. Other alcohols such as isopropanol, propanol or ethanol may be employed.

The amine component of the catalyst can be recovered by distillation or other conventional procedures.

As has been mentioned, a preferred aspect of the present process is to prepare polyphenylene ether solutions of low metal content, from which the polymers are recovered by the so-called total isolation procedures, e.g., spray drying, steam precipitation and hot water crumbing. This facilitates commercial application of such processes, which are more economical with respect to process energy requirements, solvent losses, and the like, than the precipitation methods of the prior art.

According to one feature of the invention, the polymer is recovered by a spray-drying total isolation procedure which comprises terminating the oxidative coupling reaction and removing the metal component of the catalyst residue from the reaction solution by liquid-liquid contact with the aqueous solution of the complexing agent, separating the so-treated reaction solution, and thereafter, spray-drying the reaction solution to produce the polyphenylene ether in a discrete particulate form.

A particularly useful feature of this invention is that when methanol is used to precipitate the polymer the extraction step may be completely eliminated. Extraction of the polymer solution is difficult because of the high viscosity of the solution and the tendency of the polymer to precipitate from solution. For efficient extraction, it is usually necessary to limit the polymer concentration in the solution to about 10%. With the complexing agents of this invention no extraction step is required. The particular complexer is mixed with the reaction mixture and methanol is added to precipitate the polymer and wash out the copper-polyamine complex. A major advantage of this procedure is that it can be used with concentrated polymer solutions, thus greatly reducing the amount of solvent and antisolvent required and reducing the cost of recovery of solvent and antisolvent.

DESCRIPTION OF THE PREFERRED EMBODIMENTS

The following examples serve to illustrate the invention, but they are not intended to limit it thereto, the parts being by weight, unless otherwise stated.

EXAMPLE 1

A polymerization catalyst was prepared in 1000 ml of toluene from 2.44 grams of cuprous bromide, 17.5 grams of di-n-butylamine and 10 grams of a solution of 2,6-xylenol in 250 ml of toluene. The catalyst solution was transferred to a vigorously stirred three liter reaction vessel, 500 ml of toluene was added, and the mixture was preoxidized with oxygen passed into the mixture at a rate of 1.5 cu.ft. per hour. The remainder of the monomer solution was added through a metering pump over a period of 22 minutes, followed by 50 ml of toluene, 47 ml of methanol, and an additional 50 ml of toluene. The mixture was maintained at 26° C. After ninety minutes a small sample was withdrawn, stirred with aqueous acetic acid and centrifuged. The upper phase of the centrifuged sample was decanted and the polymer was precipitated by the addition of methanol and the intrinsic viscosity was determined to be 0.34 dl/g. in chloroform at 30° C. Immediately after the small sample was withdrawn 8.1 grams of di-o-tolylbiguanide was added to the reaction mixture and oxidation was continued for another 30 minutes. At the end of this time another sample was withdrawn, acidified and precipitated as described above. The intrinsic viscosity was determined to be 0.35 dl/g. as measured in chloroform at 30° C. Thereafter the poly (2,6-dimethyl-1,4-phenylene) ether was recovered from the reaction mixture by precipitation with methanol.

EXAMPLE 2

The procedure of Example 1 was repeated except that the di-o-tolylbiguanide was replaced by 3.4 grams of biguanide. The intrinsic viscosity after 90 minutes was 0.36 dl/g., as measured in chloroform at 30° C 30 minutes after the addition of biguanide, the intrinsic viscosity was still 0.36 dl/g.

EXAMPLE 3

The procedure of Example 1 was repeated except that diphenylguanidine (0.9 grams) was added to the catalyst premix, methanol was not used as a cosolvent and the di-o-tolylbiguanide was replaced by 2.86 grams of dicyanodiamide which was added after 120 minutes. Samples were isolated prior to addition of the dicyanodiamide and 30 minutes later as described below:

| Sample (min.9 | Isolation | I.V. (dl/g) | Copper (ppm) |
|---|---|---|---|
| 120 | Acidified, centrifuted, precip- and reslurried with methanol | 0.54 | 6 |
| 150A | Precipitated directly from reaction mixture and reslurried with methanol | 0.53 | 72 |
| 150B | Centrifuged, precipitated and reslurried with methanol | 0.53 | 54 |
| 150C | Same as sample 120 | 0.53 | 6 |

EXAMPLE 4

The procedure of Example I is repeated using L-Arginine in place of the di-o-tolylbiguanide with similar results.

The invention in its broader aspects is not limited to the specification, methods, steps and improvements shown and described herein, but departures may be made within the scope of the accompanying claims without departing from the principles of the invention and without sacrificing its chief advantages.

We claim:

1. In a process for forming a polyphenylene ether by an oxidative coupling reaction in the presence of a catalyst which comprises a complexed metal ion and an amine, said process comprising passing an oxygen-containing gas through a reaction solution of a phenol and said catalyst, the improvement which comprises separating the catalyst from the polyphenylene ether by the addition of a sufficient amount of a complexing agent selected from the group consisting of biguanide, di-o-tolylbiguanide, dicyanodiamide and L-Arginine to produce a complexed catalyst mixture and the polyphenylene ether and thereafter separating the polyphenylene ether from said mixture.

2. A process as defined in claim 1 wherein said polyphenylene ether is of the formula

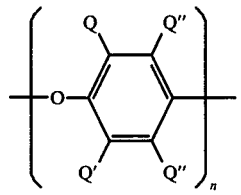

wherein Q is a hydrocarbon radical, a halohydrocarbon radical having at least two carbon atoms between the halogen atom and the phenol nucleus, a hydrocarbonoxy radical or a halohydrocarbonoxy having at least two carbon atoms between the halogen atom and the phenol nucleus; and Q' and Q" are the same as Q and, in addition halogen, provided that Q, Q' and Q" are all free of a tertiary alpha-carbon atom, and n is at least 50.

3. A process as defined in claim 1 wherein Q and Q' are hydrocarbon radicals having from 1 to 8 carbon atoms and Q" are each hydrogen.

4. A process as defined in claim 1 wherein Q and Q' are each methyl radicals.

5. A process as defined in claim 1 wherein said metal ion is copper.

6. A process as defined in claim 1 wherein said amine is a primary or secondary amine.

7. A process as defined in claim 1 wherein said complexing agent is L-Arginine.

8. A process as defined in claim 1 wherein said complexing agent is biguanide.

9. A process as defined in claim 1 wherein said complexing agent is di-o-tolybiguanide 10. A process as defined in claim 1 wherein said complexing agent is dicyanodiamide.

11. A process as defined in claim 1 wherein the polyphenylene ether is separated from the complexed catalyst mixture by the addition of an antisolvent.

12. A process as defined in claim 11 wherein the antisolvent is methanol.

13. In a process for forming a polyphenylene ether by an oxidative coupling reaction in the presence of a catalyst which comprises a complexed metal ion and an amine, said process comprising passing an oxygen-containing gas through a reaction solution of a phenol and said catalyst, the improvement which comprises separating the catalyst from the polyphenylene ether by the addition of a sufficient amount of a complexing agent selected from the group consisting of biguanide, di-o-tolyl-biguanide, dicyanodiamide and L-Arginine to produce a complexed catalyst mixture and a solution of polyphenylene ether, separating said complexed catalyst mixture from said solution of polyphenylene ether to obtain a solution of polyphenylene ether free of complexed catalyst and thereafter separating the polyphenylene ether from said solution of polyphenylene ether that is free of complexed catalyst.

* * * * *

UNITED STATES PATENT AND TRADEMARK OFFICE
CERTIFICATE OF CORRECTION

PATENT NO. : 4,097,458
DATED : June 27, 1978
INVENTOR(S) : James G. Bennett et al.

It is certified that error appears in the above—identified patent and that said Letters Patent are hereby corrected as shown below:

Column 5, line 26, "(Min.9" should read -- (min.)--.

Column 6, line 36, "di-o-tolybiguanide" should read

-- di-o-tolylbiguanide --.

Signed and Sealed this

Twenty-fourth Day of July 1979

[SEAL]

Attest:

LUTRELLE F. PARKER
Attesting Officer     Acting Commissioner of Patents and Trademarks